July 24, 1962

G. E. MORRISON ETAL 3,045,795

TYPEWRITER INPUT COUPLER

Filed Oct. 28, 1958

INVENTORS:
Charles R. Williams
Guy E. Morrison

By Smyth & Roston
Attorneys

July 24, 1962

G. E. MORRISON ETAL 3,045,795

TYPEWRITER INPUT COUPLER

Filed Oct. 28, 1958

INVENTORS:
Charles R. Williams
Guy E. Morrison

Smyth & Roston
Attorneys

July 24, 1962

G. E. MORRISON ETAL 3,045,795

TYPEWRITER INPUT COUPLER

Filed Oct. 28, 1958

INVENTORS.
Charles R. Williams
Guy E. Morrison

Smyth & Roston
Attorneys

United States Patent Office 3,045,795
Patented July 24, 1962

3,045,795
TYPEWRITER INPUT COUPLER
Guy E. Morrison, Rolling Hills, and Charles R. Williams, Palos Verdes Estates, Calif., assignors, by mesne assignments, to General Instrument Corporation, Hawthorne, Calif., a corporation of New Jersey
Filed Oct. 28, 1958, Ser. No. 770,210
5 Claims. (Cl. 197—20)

This invention relates to electric business machines and more particularly relates to apparatus for delivering information from a punched card or tape and into the typewriter mechanism of an accounting machine. The information so delivered may then be typed onto any type of document inserted in the accounting machine for use in the business operations in which the machines are employed.

Much routine information and certain computations based thereon, particularly in large businesses and government, are processed by various types of business accounting machines. Examples of information and computations readily lending themselves to such machine processing may be found in the fields of sales accounting inventory control and payroll preparation, including determinations of withholding tax and social security deductions.

Prior to the present invention, it has been necessary for an operator to read certain information such as hourly rate of pay, hours worked, deductions, etc., from a typed or printed record, and retype the information by means of the keyboard of an accounting machine onto a ledger sheet, payroll record, or other document. Computations of gross pay, Federal and State withholding, Federal Old Age Insurance, and other deductions may then be made by punching the appropriate information into the computer keys of the accounting machine, and the results which are thereby computed are printed on the same document in a predetermined spaced relationship to the typed information.

The thus retyped information, however, such as the employee's name, social security number, department and classification may be punched into cards for automatic call-up when required in making up documents such as checks, payroll cards, ledger accounts, etc. Other information, such as number of hours worked during a particular period, rates of pay, number of withholding tax deductions from which computations are made on the accounting machine may be taken from other sources and is fed manually by punching it into the accounting machine.

The present invention is directed to the establishment of a system wherein the information which is to be retyped for successive computing operations may be punched onto cards or tapes. The punched cards or tapes are read by a sensing machine at the time that the computations are to be made, and at the time that the documents are to be typed with reference to such information and computations. The coded information contained on such cards or tapes and read by the card sensing machine is decoded by a relay arrangement, which passes pulses to energize in proper sequence appropriate pull solenoids disposed below the keys on the typing bed of the accounting machine. These solenoids are coupled to the keys to actuate the keys. Each of the pull solenoids is disposed to move along a vertical axis and is coupled by means of a vertical arm directly to one of the typewriter arms, so as to apply a downward force to type a character whenever the solenoid is momentarily energized. In this manner, the repetitive information on the cards or tapes is fed into the accounting machine for typing on documents which also receive the results of computations made manually on the accounting machine in respect of such carded information.

The use of the novel system and typewriter input coupler means of the present invention relieves the accounting machine operator of many hours of labor in retyping the basic repetitive data for successive operations in respect of which computations are to be made. This labor saving results in decreasing the cost of accomplishing this business operation. Moreover, machine processing of such data means the elimination of the possibility of human error in this area.

The number of relays required in the decoding section of the means employed in the invention is kept to a minimum by the use of a gated series-parallel arrangement of reader contacts and/or solenoids, in which different combinations result in transmitting pulses to different pull solenoids. The arrangement of relays is considered to be a novel feature of this invention. As will be described in detail subsequently, the card may be considered to be coded in an essentially decimal pattern. The relays are coupled to the sensing fingers in the unit for sensing the holes in the cards so as to convert the code of holes partially into a binary code while retaining partially a decimal code. By converting the essentially decimal code on the cards into an essentially binary-decimal pattern, the number of relays and associated switches required to operate the different typewriter keys is minimized.

The system of the invention further provides, by a sequential actuation of different relays, for the proper cycling of the sensing unit. The system further provides a control over the speed of reading the information on the cards in relation to the actual typing of the decoded data upon the keys of the accounting or computing machine.

Other objects and features of the system and means of the invention will be apparent upon a consideration of the following detailed specification made in reference to the accompanying drawings in which, FIGURE 1 is a block diagram of the several units employed in the system of the invention;

FIGURE 6 is a schematic diagram of the electrical circuitry for use with a typical card sensing unit to obtain the operation of a typewriter in accordance with the information recorded on the card.

Figure 2:
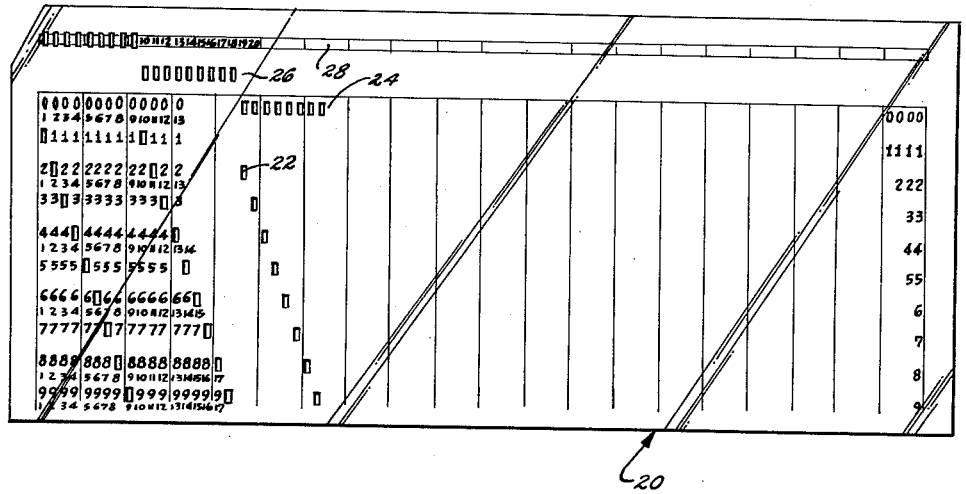
FIGURE 2 is a plan view of a typical card with information coded thereon.

FIGURE 2 shows a general purpose punched card 20 of the International Business Machine Company (IBM) type, which cards are extensively employed in business and industry. As is well understood by those skilled in the punch card machine art, this particular type of card is designed to provide vertically a total of twelve punching positions for each column. These include nine positions 22 extending consecutively upwardly from the bottom of the card respectively to indicate the digits "1" to "9," inclusive. The tenth position from the bottom of the card is indicated at 24 and is adapted to indicate the digit "0." The top two zone positions are indicated at 26 and 28 in FIGURE 2 and are referred to as zones "11" (and sometimes "X") and "12" respectively in the order of their elevation on the card. This card also provides, across its width, eighty of the vertical columns in which punches may be made in any of the twelve horizontal punching positions.

Conventionally, digits are punched in the appropriate "0-9" positions. The alphabet, however, is represented by various combinations of two punches: one in one of the zones "0," "11" (or "X") and "12"; and the other in one of the "1–9" positions. Thus, A is encoded as one punch in the top 12 positions and by a second punch in the same vertical column in the digit "1" position. This coding is well understood in the art and represents but one of numerous types of punch card code systems which are in use at the present time to obtain a permanent storage of data or information—in this instance, expressible in Arabic numerals and the English alphabet.

Figure 2A:
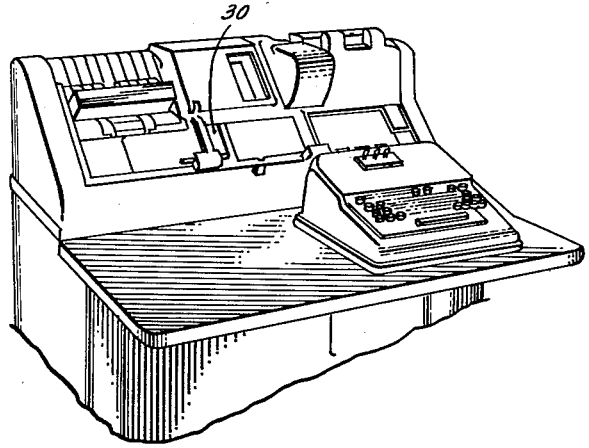
FIGURE 2a is a perspective view of an IBM card punching and sensing machine which is employed in conjunction with one embodiment of the present invention.

A card of the type shown in FIGURE 2 and described above may be "read" by sensing unit 30 (FIGURE 2a) in accordance with the combinations of holes punched in successive columns of the card to represent numerals and letters of the English alphabet. The sensing of the information by the unit 30 may be obtained by a row of fingers or brushes (not shown) which are pressed simultaneously against all punching positions in a single vertical column. Where a hole has previously been formed in the column being sensed at any instant, the finger on such position passes through the card to complete a circuit. Such circuit completion in conventional machines may be employed to punch out duplicate cards or to cause the machine to perform other functions (e.g., see U.S. Patent Nos. 2,569,805 and 2,684,719). By way of illustration, such features are shown in FIGURES 16, 16a, 16b and 16c and described in columns 21 to 24, inclusive, of Johnson Patent 2,684,719.

Figure 1:
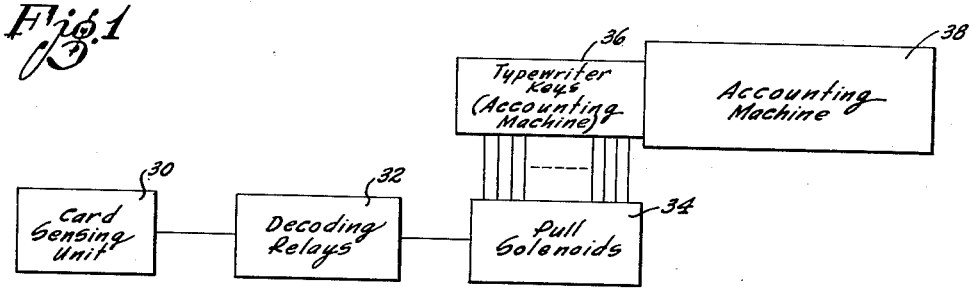

The system of the present invention is coupled to the sensing portion of a conventional card punching machine as described in the previous paragraph. Thus, the card sensing unit 30 shown in block diagram in FIGURE 1 and in FIGURE 2a of the drawings is actually a part of such a conventional card punching machine. The analysis of the holes in each card by the brushes or fingers (in the card sensing unit 30) causes a corresponding sequence of relays 32 (FIGURE 1) to be actuated such that a decoding of the information represented by the combination of holes is obtained. The relays 32 in turn control the passage of energizing pulses in proper sequence to the proper solenoids of a plurality of pull solenoids 34. The particular solenoid 34 energized at any instant is dependent upon the particular relay or relays 32 energized at that instant. The energized solenoids in turn actuate typing keys 36 coupled to the solenoids, the typing keys 36 being included in an accounting machine 38, such as is illustrated and described in U.S. Patent No. 2,626,749 issued to the National Cash Register Company of Dayton, Ohio as assignee and listing Christian et al. as inventors. This later machine may hereafter be referred to as the "NCR" machine.

The manner in which this decoding and proper solenoid actuation is accomplished may best be understood by a consideration of the circuit diagram contained in FIGURE 6. It will be noted in FIGURE 6 that a total of 10 relays is employed in a sequential arrangement which enables the system to distinguish between at least 39 different combinations of holes in the vertical columns of cards 20. Although 10 relays are included in the arrangement shown in FIGURE 6, as few as 7 relays may actually be used to provide an alphanumeric coding, as will be apparent from the subsequent discussion. The twelve duplicator pins in the sensing unit 30 are designated by the reference numeral 40. These and other portions of the circuit within the dash line enclosures are actually a part of the sensing unit 30, which may be a conventional punch card machine as described above.

In the schematic diagram of FIGURE 6, the various relays are designated by reference characters L1–L17. To facilitate correlation of the switching accomplished by these several relays, the switches operated by these relays are designated by corresponding S characters (e.g., relay L1 operates a switch S1). Where a relay operates more than one switch, the separate switches will be designated further by suffix characters a, b, c, etc. For example, relay L1 actually controls the operation of switches S1a and S1b in FIGURE 6.

The ten relays L12, L11, L10, L1, L2, L4, L8, L5, L3 and L6 are connected to the twelve duplicator pins 40 in the sensing unit 30. Relay L1 is connected directly to the "1" pin in the sensing unit 30 and is coupled through a diode 50 to the "3" pin in the sensing unit. In like manner, relay L2 is connected directly to the "2" pin in the sensing unit 30 and is coupled through a diode 51 to the "3" pin in the sensing unit. Similarly, other relays are coupled through diodes 53–58 to other pin connections in the manner shown. The reason for this will be described in detail subsequently.

One terminal of each of the relays L1–6, L8 and L10–12, extends electrically to a common B+ connection 42. The other terminal of each said relay, in addition to being connected to at least one duplicator pin, is connected through a resistance element 44 to a common lead 46. The latter is in turn connected to a common lead 48 between one side of the switch S13b operated by the relay L13 and the type switch 112, for grounding L13 and L7, as hereinafter explained. The function and operation of the duplicator pins 40 in the sensing unit 30 are well-known in the art and in themselves form no part of the present invention. (E.g., see FIGURE 13 of expired U.S. Patent No. 1,962,750.) Also see IBM Customer Engineering Manual of Instruction, copyrighted 1950, 1953 with minor revision of April 1957.

Relay L12 operates a single-pole, double-throw switch S12, the pole 60 of which is connected to B+ at 62. The two alternate switch positions 63 and 64 determine whether the typing solenoid circuit will be completed through the solenoids for the characters ampersand (&), A–H and period (.) (if L12 is energized to close S12's pole 60 with the B+ with contact 63), or through the solenoids for the remaining type characters (if S12 is left open so that the B+ passes through contact 64).

L11 operates a double-pole, double-throw switch S11a, S11b. Switch 11a (when relay L11 is not energized) allows switch S12 to apply B+ voltage to the &, A–H and period (.) solenoids, upon the energizing of relay L12. When relays L11 and L12 are not energized, switches S12 and S11b are in position for the B+ voltage to be applied either to the O, EL, S, T, U, V, W, X, Y, Z or to the space and 1–9 digit solenoids in accordance with the energizing or lack of energizing of the relay L10. When energized, relay L11 closes switch S11a in the line 66 to the &, A–H and period (.) solenoids; and shifts switch S11b to the left hand stationary position in FIGURE 6 to open the line 68 to the S10 switch pole, while simultaneously closing the line 70 to pass the B+ to the TAB, J, K, L, M, N, P, Q and R solenoids.

Except for the period (.) solenoid 72, each of the solenoids of each of the four groupings is commonly connected with one solenoid from most of the other groups to the relay tree designated generally by the numeral 74. Diodes 76 serve to insulate each relay 78 from back circuits through their common connections.

The relay switches S1–S6 and S8 are cascaded in a tree arrangement 74 to effect, with the switches S10, S11 and S12, the closing of a voltage circuit to energize each individual solenoid. The individual solenoid energized at any instant corresponds to the character encoded by holes in the punch card which is "read" by the sensing unit's fingers or brushes at the instant. Thus, the character A, which is encoded as punches in the 12 position and 1 digit in the same vertical column, is typed by the "A" key in the accounting machine keyboard, because the fingers or brushes of the sensing unit 30 close contacts through these two so positioned punch and pick relays L12 and L1. L12, when energized, operates switch S12 to close the B+ line to the &, A–H and period (.) group of solenoids, while cutting the connection to other possible groups of solenoids; and L1 shifts switches S1a and S1b, the former completing the circuit to ground (through S15 the function of which will be discussed later). The relay tree 74 is arranged to permit grounding of only one of the eleven terminals 80 at any single instant.

The operation of the relays L1 to L12, inclusive, and of the switches associated with the relays may be seen from the following discussion. In a normal code, the numerical values "1" to "9," inclusive, are represented by a single hole which is punched in the corresponding row on the card. For example, the number "3" is represented by a hole punched in the "3" row on the card. The alphabet is represented by a combination of at least one hole in the "1" to "9" positions and a hole in one of the "0," "11" and "12" positions, which may be considered to correspond to values of "10," "20" and "30." In this way, the alpha-numeric code is indicated on a card by a decimal representation for numerical values and alphabetical values. The conversion of decimal values of "10," "20" and "30" under the alpha-numeric code of punched holes is obtained on a corresponding decimal basis by the energizing of the relays L10, L11 and L12 in a manner similar to that explained above.

The relays L1 to L12, inclusive, and their associated switches operate to decode the decimal codes by using somewhat straightforward binary techniques in part and by using somewhat straightforward decimal techniques in part. As a preliminary to the explanation of such techniques, it should be appreciated that the relays L3 and L5 have a binary significance corresponding to the relay L1. This may be seen from the switching matrix 74 where the relays S1, S3 and S5 all appear at the same digital level in the matrix. The relays L3 and L5 are included since it would have been difficult for the relay L1 to control the operation of all of the switches S1, S3 and S5 in the switching matrix 74. Similarly, the relay L6 has a binary significance corresponding to the relay L2. The relay L6 is included to lessen the switching load which would otherwise be imposed on the relay L2 in the switching matrix 74.

As will be seen, the relays L1, L2, L4 and L8 and their associated relays L5, L3 and L6 are coupled in a binary pattern to the pins "1" to "9," inclusive, in the sensing unit 30. For example, the decimal value "7" can be represented in binary form by 111, where the least significant digit is at the right and where successive binary digits have decimal values of "1," "2" and "4." For this reason, the L5, L6 and L4 relays are energized from the "7" pin in the sensing unit 30 to correspond to values of "1," "2" and "4." In like manner, a value of "9" is represented in binary form by values of 1001, where the least significant digit is at the right. This is obtained by an energizing of the relays L3 and L8 to correspond to binary values of '1' for the first and fourth digits in the binary representation.

The switches S1 to S6, inclusive, and S8 are connected in a matrix arrangement so that separate paths are followed to the numerical and alphabetical solenoids in accordance with the particular combinations of relays L1 to L6, inclusive, and L8 which are energized. The relays L10, L11 and L12 then operate to control which bank of the numerical and alphabetical solenoids can be actuated. For example, only the bank of solenoids "&," "A" to "H," inclusive, and "(.)" can be actuated when the relay L12 is energized and only the bank of solenoids "O," "EL" and "S" to "Z," inclusive, can be actuated when the relay L10 is energized. By actuating a particular bank of solenoids in accordance with the energizing of the relays L10, L11 and L12 and by selecting one of the solenoids in accordance with the energizing of the relays L1 to L6, inclusive, and L8, any particular one of the solenoids can be energized at any particular instant.

In this way, a decimal representation of holes in a card is converted into a binary energizing of relays to represent values between "1" and "9," inclusive, and into a decimal energizing of relays to represent values of "10," "20" and "30." This combination of binary and decimal energizing of relays controls the operation of a switching matrix to obtain an individual energizing of a plurality of solenoids. By using the combination of binary and decimal energizing of relays and the particular switching matrix, the number of relays and associated switches is minimized.

The operation of the typewriter input coupling means shown in FIGURE 6, is initiated by closing the "Start-Read" switch 82. The latter may be placed on the left hand cover of the NCR machine. The closing of the switch contacts 82 effects the energizing of relay L7. This relay latches itself by means of one of its own switching contacts S7A. It will be observed that with the closing of either the "Start-Read" switch 82 or the switch S7A, one side of the relay L7 is effectively grounded through the switch S17a, the Tab switch S88 and the Carriage Reverse switch S90. Each of the latter switches remains closed until pulled open by an operation later to be described. The energizing of the relay L7 effects, through the closing of the switch contact S7b, an energizing of the relays L13, L14 and L15 whenever the switch 93 is in a closed position to complete a circuit to ground. As will be described subsequently, the switch 93 is closed by operation of the cam 92. The switch 93 is closed at 86° of cam cycle rotation by cam 92.

The closing of the "Start-Read" switch 82, mounted on the NCR machine, also initiates rotation of the cams 92 and 95 in the IBM sensing unit 30 by operating the relay L9 which closes its switch S9 to ground the punch clutch 96, thereby causing the IBM machine to run a dummy cycle.

It should be explained that the IBM machine is provided with a cam shaft (not here shown) upon which five cams are disposed, each of which may be shaped and set on the shaft to perform a switching operation at a different point in the cam shaft cycle, and for a different interval. The switching of two of these IBM cams is utilized in the illustrated and described embodiment of the present invention. Thus, cam 92 is shown to operate switch 93; and cam 95 operates switch 94a. Once operation of the IBM reader is initiated, it continues through a complete cycle from 346° to 345° of cam shaft rotation, at which latter point it is stopped, until recycled. This cycling of, and cam switching in the IBM machine is well understood by those familiar with the particular type of IBM machine.

The IBM cam 95 is coupled to a switch 94a in the sensing unit 30 to actuate that switch so that B±voltage is appled to the terminal 94 during the 180° to 0° portion of the 360° cycle of rotation of the cam shaft. Since the punch clutch stops the IBM cam shaft at 345°, B+ voltage will be on terminal 94 at the end of every cam shaft cycle. Thus, when the "Start-Read" switch is closed to ground relay L9 temporarily, through the switches S14, S13a, S7a, S17a, S88 and S90, all of which at this instant are closed, relay L9 is energized. This energizing of the relay L9 closes the switch S9 to ground the IBM punch clutch 96 included in the sensing unit 30.

When so grounded, the punch clutch 96 initiates a dummy reading cycle without moving the card which is in the reading station of the IBM sensing unit 30. When the cam cycle reaches 0°, the B+ voltage is taken off by the terminal 94 by the cam 95 reopening the switch 94a. Relay L9 thereupon is de-energized after a short time delay interval determined by its R-C circuit 97, and, with its de-energization, switch S9 is re-opened to sever the ground line to the punch clutch 96. As pointed out above, however, once the IBM clutch is actuated it remains locked in to rotate the IBM cam shaft around to 345° at which point in the cycle the shaft is stopped.

At 86° of the cam cycle rotation, the cam 92 closes switch 93, thereby energizing relays L13, L14 and L15. When energization of L13 and L14 occurs, the double-pole switches S13a and S14a are shifted from the stationary positions shown in FIGURE 6 to the other stationary positions to break the ground line of relay L9 and make other circuit connections.

These other connections effect initially a grounding of relay L16; and later, when switch S13a is shifted back to its right hand stationary position by the de-energization of relay L13, a grounding of the IBM space terminal 115. When this latter grounding occurs, the IBM reader moves its card one space to the right and recycles.

As previously described, the relay L13 is energized with the relays L14 and L15 by the closing of switch S7b and the cam-operated switch 93. Upon becoming energized, the relay L13 latches itself through the closing of its switch contacts S13b, which forms a continuous circuit with the "Type Advance" switch 112. This "Type Advance" switch 112 is a microswitch attached to the typing unit of the NCR machine in the manner illustrated in FIGURES 4 and 5. With each typing of a character by a key of this latter machine, the switch 112 becomes opened to de-energize the relay L13. It is at this point in the operation of the circuit that the IBM space terminal 115 is grounded to move the card and recycle as above explained.

It will be observed that the switch S13a is shifted from its right stationary contact to its left stationary contact in FIGURE 6 with each energizing of the relay L13, and vice versa upon de-energizing. Upon the energizing of relay L13, the switch S13a is shifted from the right stationary position to the left stationary position in FIGURE 6. This effects a grounding of relay L16 through a circuit including the relay L16 and the switches S13a, S7a, S17a, S88 and S90.

In the IBM type of card reading machine, the sensing fingers or pins rise to press against the card punch positions at 76° of the cam cycle and remain in that condition for approximately 100°, so that they recede at 176°. Reading actually occurs at 86° and the energizing of the relays L1 through L6, L8 and L10 through L12 corresponding to the positions punched on the card occurs at 86° when the common side 91 of the duplicating pins is momentarily grounded through the closing of the switches 93 and S7b, connected through the diode 101.

The relay L14 is employed to denote the first column of the card which is to be read. Upon being energized by the closing of the switch S7b and the cam switch 93, the relay L14 latches itself in through switch S14b and the punch control cam-operated switch 104. The relay L14 remains energized during the entire reading of columns 1 through 80 of the card, since the switch 104 in the sensing unit 30 is kept closed during such reading. The switch 104 also opens after the reading of the 80th column of the card.

The relay L14 also operates switch S14a to shift the switch arm from the left stationary position to the right stationary position in FIGURE 6. This grounds the spacing mechanism of the IBM sensing unit so that the card may be advanced one space. The grounding occurs through a circuit including the terminal 115 and the switches S17b, S16, S14a, S13a, S7a, S17a, S88 and S90.

The energizing of relay L15 effects a closing of its switch S15 at the base of the relay tree to ground the arm of switch S8 so that a circuit through the pull solenoids 34 is completed with the picking of any combination of the relays L1 through L6, L8 and L10 through L12. As previously mentioned, this picking occurs at 86° of cam rotation.

The relay L16 becomes energized when the movable arm of the switch 13a becomes pivoted into engagement with the left stationary contact in FIGURE 6. When the relay L16 becomes energized, it opens the switch S16 to break the continuous circuit from ground to the terminal 115 in the sensing unit 30. Relay L16 is a telephone type relay having a time delay adjustment which may be varied by the potentiometer 114. In this way, the timing of the spacing and recycling of the IBM machine may be adjusted, in that L16 will remain energized for a finite interval, the latter being determined by the setting of the potentiometer 114. As soon as the relay L16 becomes de-energized, the switch S16 closes again.

When the typewriter has typed the last character read from the punch card, the relay L13 becomes de-energized. Since the relay L14 is still energized and the relay L16 is de-energized, a continuous circuit is established from the terminal 115 through the switches S17b, S16, S14a, S13a, S7a, S17a, S88 and S90. The creation of such a continuous circuit to the terminal 115 causes the spacing mechanism in the sensing unit 30 to become operative so that the card becomes advanced to the next column for the sensing of the holes in this column.

The cycle is then repeated until each of the eighty columns of the punch card is "read" and the appropriate character typed, at which time the program control cam of the IBM machine opens switch 104 to stop further reading. However, L9 is not re-energized during these reading and typing cycles because L14 remains energized during all "reading" cycles until the eightieth column is read and switch 104 in the IBM machine is opened. Switch S9 is therefore kept in the left switching position shown in FIGURE 6. Further, L7 remains energized through the reading of all eighty columns because of the holding circuit established through the switch S7a.

The relay L17 is energized by an "Out-of-Cards" or "Skip" signal from the IBM machine, or by a "Carriage Reverse" operation of the accounting machine, and halts further typing by the solenoids 34 whenever the IBM machine is out of cards, the reader skips or the typewriter is moving to tabulate, or returning its carriage. Thus, relay L17 when energized will open switch S17a to interrupt the circuit including switches S88 and S99. The energizing of relay L17 will also cause the switch S17b to open so as to interrupt the circuit to the space and punch cycling mechanism of the IBM machine.

Figure 4:
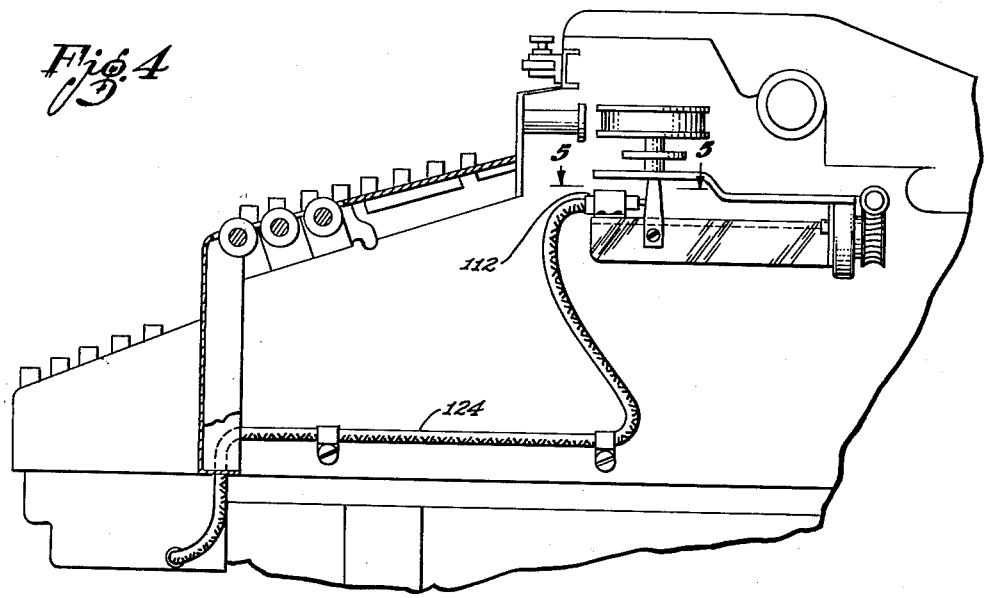
FIGURE 4 is a side elevational view, partly in section, of the key pull mechanism attached to the underside of a typical computing machine and further showing the arrangement of the type switch control element.
Figure 5:
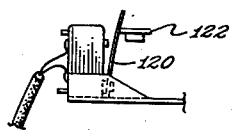
FIGURE 5 is a section on the line 4—4 of FIGURE 4.

The type switch 112 and its location on the accounting machine 36 and 38 are shown in detail in FIGURES 4 and 5. As will be seen, the type switch may be of the construction designated under the trademark of "Microswitch" by the Minneapolis-Honeywell Regulator Company. The type switch 112 is normally closed and is coupled to a pawl 122 forming a part of the typewriter ribbon feed mechanism. As a result of this coupling, the switch 112 is adapted to become opened whenever a character is typed by the typewriter.

Figure 3:
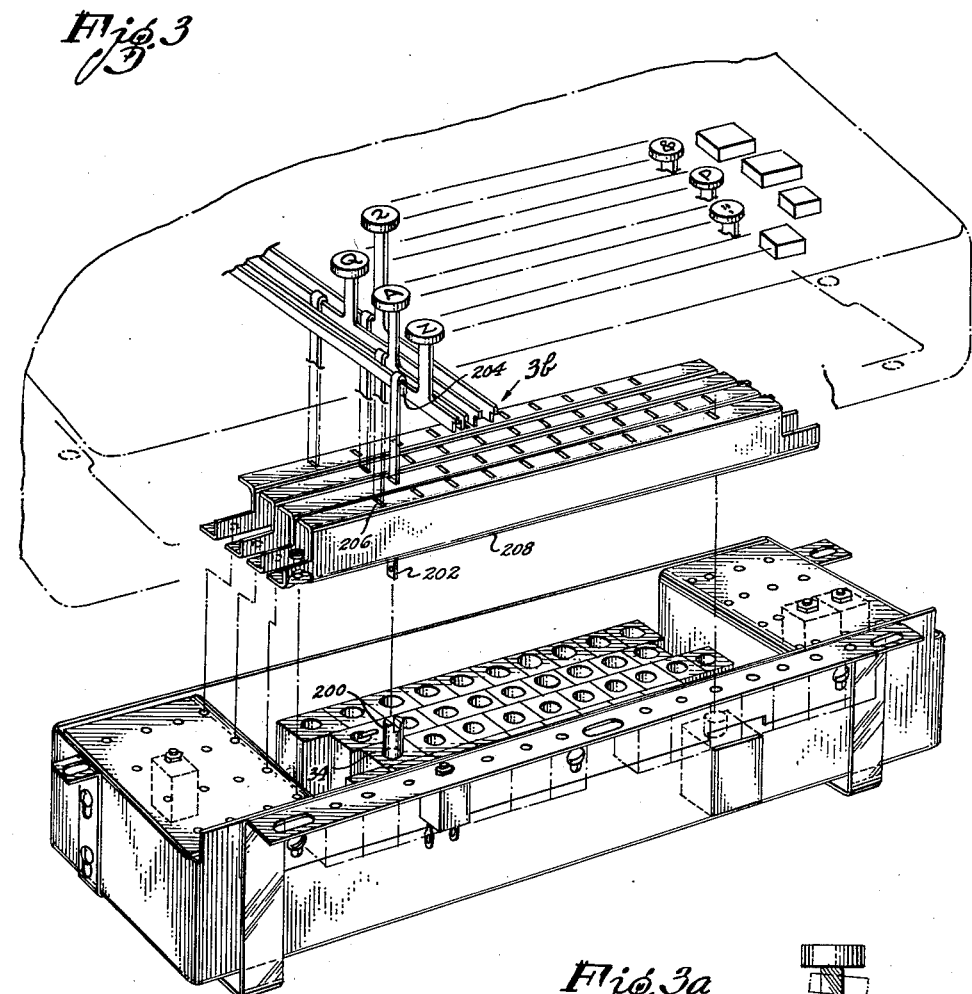
FIGURE 3 is an enlarged exploded perspective view showing the battery of solenoids and the manner in which they are connected to operate the typewriting keys of the computing machine.
Figure 3A:
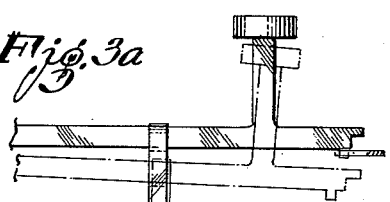
FIGURE 3a is an enlarged fragmentary elevational view showing the manner in which the pull solenoids are coupled to the typewriter keys.
Figure 3B:
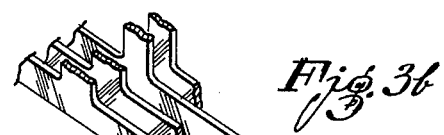
FIGURE 3b is an enlarged fragmentary perspective detail showing the manner in which the typewriter keys are arranged to prevent more than one key from being depressed simultaneously.
Figure 3B:
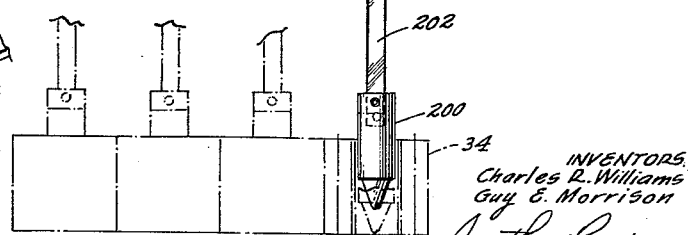

The relationship of the solenoids such as the solenoids 34 in FIGURE 6 to the keys in the typewriter are shown in FIGURES 3, 3a and 3b. As will be seen, the solenoids are disposed in stacked relationship below the typewriter keys. An armature 200 is magnetically coupled to each solenoid so as to be attracted downwardly into the solenoid when the associated solenoid becomes energized. An arm 202 is pivotably coupled to the solenoid at one end and is provided with a hooked configuration 204 at its other end. The arm 202 is disposed in a vertical direction such that the hook 204 rests on an associated one of the typewriter keys in loosely coupled relationship to the typewriter key. Each arm 202 extends through a hole 206 in a guide member 208 so that the movement of the arm is limited to a substantially vertical direction.

When one of the solenoids such as the solenoid 34 is energized, it actuates its associated armature 200 so that the armature and the associated arm 202 are attracted downwardly. The hooked portion 204 of the arm 202 engages the associated typewriter key so as to depress the key. By providing such an arrangement, the keys cannot become loaded even during the time that they are depressed. Furthermore, the loose coupling between the hooked portion 204 of the arm 202 and the associated typewriter key prevents the arm from interfering with the key when the key is manually depressed. The hooked portion 204 extends downwardly for a sufficient distance so that the arm 202 cannot become decoupled from the associated typewriter key even when the key is manually depressed.

Means are included in the typewriter for preventing two or more keys from being simultaneously actuated. Such means include a lug 210 which extends downwardly at an oblique direction from each typewriter key. When the key is depressed, the lug 210 enters into a slot 212 in a horizontal bar 214 so as to move the bar in a lateral direction. This lateral movement of the bar 214 tends to lock the other typewriter keys against a depression of the keys. Upon a release of the depressed key, the bar 214 is moved laterally back to its position of rest under the action of a spring 216.

Although this invention has been disclosed and illustrated with reference to particular applications, the principles involved are susceptible of numerous other applications which will be apparent to persons skilled in the art. The invention is, therefore, to be limited only as indicated by the scope of the appended claims.

We claim:

1. In combination for operating the different keys in a typewriter in accordance with information recorded on a medium in a particular pattern wherein the different bits of information capable of being recorded in the medium have a first matrix coding relationship to one another, the first matrix coding relationship being in decimal-digital form, sensing means operative in accordance with the information recorded on the medium, relay means coupled to the sensing means to convert the operation of the sensing means into a corresponding operation of the relay means into partially a second matrix coding relationship different from the first matrix coding relationship and to obtain an operation of the relay means partially in the first coding relationship, said second matrix coding relationship being in binary-digital form, and control means individually coupled to the different typewriter keys and responsive to the operation of the relay means for converting the partial operation of the relay means in the first and second coding matrix relationships into activations of the control means in accordance with the operation of the relay means to obtain an activation of individual typewriter keys dependent upon the activation of the control means.

2. In combination for operating the different keys in a typewriter in accordance with information recorded on a medium in a plurality of rows and in a particular pattern in the rows wherein the different bits of information capable of being recorded in the medium have a first matrix relationship to one another said first matrix relationship being in decimal digital form, a plurality of sensing means coupled to the different rows in the medium for operation in accordance with the information recorded in the different rows on the medium and for operation in the first particular matrix relationship, a first plurality of electrical control means each responsive to the operation of first individual ones of the sensing means in the plurality to become energized in a pattern directly related to the operation of these sensing means, a second plurality of electrical control means each responsive to the operation of second individual ones of the sensing means in the plurality to become energized in a pattern different from the operation of the second sensing means and in a second matrix relationship different from the first matrix relationship and accordingly not in decimal digital form, electrical circuitry disposed in a matrix relationship having a plurality of paths for obtaining an individual activation of the different paths in accordance with the energizing of the sensing means in the first and second pluralities, a plurality of actuating means each coupled to a different one of the typewriter keys and each connected to become operative upon the activation of an individual one of the paths in the electrical circuitry, and means including control means sequentially operative upon the sensing of each bit of information in the medium and the actuation of a typewriter key in accordance with this bit of information to obtain a sensing of the next bit of information in the medium and the actuation of a typewriter key in accordance with this bit of information.

3. In combination for operating the different keys in a typewriter in accordance with information recorded on a medium in a plurality of rows and in a particular pattern in the rows wherein the different bits of information capable of being recorded in the medium have a first matrix relationship to one another, said first matrix relationship being in decimal digital form, a plurality of sensing means coupled to the medium for operation in accordance with the information recorded on the medium and for operation in the first particular matrix relationship, a plurality of first electrical control means coupled to first particular ones of the sensing means to become energized directly in accordance with the operation of the coupled sensing means and for operation in the first particular matrix relationship, a plurality of second electrical control means each coupled to different ones of the second particular ones of the sensing means to become energized in accordance with the operation of the second sensing means and in a second matrix relationship different from the first matrix relationship, said second matrix relationship being in binary digital form, means including a switching matrix coupled to the first and second control means for individual operation in accordance with the energizing of the different control means in the first and second pluralities, means including third control means coupled to the sensing means and responsive to the presentation of the medium for initiating reading cycles of the information recorded on the medium, and means including fourth control means responsive to the sensing of each bit of information on the medium and including switching means disposed in the switching matrix for obtaining a sequential operation of the typewriter keys in accordance with the sensing of each bit of information.

4. In combination for operating the different keys in a typewriter in accordance with information recorded in substantially decimal form on a card in a plurality of rows and in a particular pattern in the rows to represent alphanumeric information, a plurality of sensing means each coupled to a different one of the rows on the cards to become operative upon the recording of information in the coupled row, a first plurality of electrical control means coupled to first individual ones of the sensing means in the plurality for operation in a substantially decimal relationship, a second plurality of electrical control means coupled to second individual ones of the sensing means in the plurality to become energized in a representation indicative in binary form of the decimal value of the second sensing means being energized at any instant, and electrical circuitry coupled to the control means in the first and second pluralities and including actuating means individually responsive in accordance with the particular combination of control means energized in the first and second pluralities to obtain an operation of the typewriter keys in accordance with such individual response.

5. In combination for operating the different keys in a typewriter in accordance with information recorded in substantially decimal form on a card in a plurality of rows and in a particular pattern in the rows to represent alpha-numeric information, a plurality of sensing means each coupled to a different one of the rows on the cards to become operative upon the recording of information in the coupled row, a first plurality of electrical control means each coupled to a different one of first sensing means in the plurality to become energized in accordance with the operation of the coupled sensing means, a second plurality of electrical control means coupled to different ones of second sensing means in the plurality to become energized in a pattern indicative on a binary basis of the decimal value of the second sensing means being made operative at any instant, matrix means responsive to the energizing of the control means in the first and second pluralities and coupled to the typewriter keys to obtain an individual actuation of the different keys in accordance with the particular ones of the control means energized in the first and second pluralities, means including first relay means responsive to the actuation of the typewriter keys to obtain an advance of the card to present the next piece of alpha-numeric information on the card for conversion into typewriter form, and means including second relay means responsive to the advance of the card to the next piece of information on the card to obtain an operation of the matrix means in accordance with the energizing of the control means in the first and second pluralities.

References Cited in the file of this patent
UNITED STATES PATENTS

| | | |
|---|---|---|
| 1,481,110 | Pond | Jan. 15, 1924 |
| 1,688,364 | Thompson | Oct. 23, 1928 |
| 2,199,541 | Harrison et al. | May 7, 1940 |
| 2,285,444 | Kloid | June 9, 1942 |
| 2,555,734 | Dodge | June 5, 1951 |
| 2,698,075 | Luhn | Dec. 28, 1954 |
| 2,865,487 | Hildebrandt | Dec. 23, 1958 |